United States Patent Office 2,716,081
Patented Aug. 23, 1955

2,716,081

FLUORESCENT SCREENS

Franklin J. Marks, Towanda, Pa., assignor to E. I. du Pont de Nemours and Company, Wilmington, Del., a corporation of Delaware No Drawing. Application November 19, 1951,
Serial No. 257,199

11 Claims. (Cl. 154—95)

This invention relates to fluorescent screens. More particularly, it relates to fluorescent screens having a matte surface in which a mixture of cellulose nitrate and a cellulose ether is used as the binding agent for the fluorescent particles. Still more particularly, it relates to such screens which have an outer water-resistant protective layer.

An object of this invention is to provide improved fluorescent screens. A further object is to provide such screens which have a dull or matte surface. Another object is to provide a simple and practical process for making such screens. Yet another object is to prepare such screens from readily available and economical materials. Still other objects will be apparent from the following description of the invention.

The fluorescent screens of this invention are made by suspending discrete particles of a fluorescent material in a solution of a mixture of cellulose nitrate and a water-insoluble cellulose ether, e. g., an alkyl cellulose ether wherein the alkyl group contains from 1 to 7 carbon atoms or benzyl cellulose, coating the resulting solution onto a cellulose acetate layer disposed on a smooth or polished casting surface, applying a suitable backing sheet and stripping the assembly from the casting surface.

In carrying out the invention, a solution in a volatile solvent of cellulose acetate, cellulose acetate propionate or cellulose acetate butyrate or other cellulose ester containing a high percentage of acetate groups is cast onto a smooth surface, e. g., a glass plate to form a thin layer having a thickness of 0.002 to 0.05 millimeter, a suspension of fluorescent particles in a solution comprising a mixture of cellulose nitrate, a water-insoluble cellulose ether, e. g., ethyl cellulose and a high-boiling cellulose acetate solvent is coated onto the layer of the hydrophobic cellulose acetate, a backing sheet of paper, cardboard, cellulose derivative, synthetic resin or superpolymer is applied to the freshly cast surface of the fluorescent layer or onto an adhesive layer on such layer and the entire assembly including the cellulose acetate layer is removed from the casting surface.

It has been discovered that after the assembly has been removed from the casting surface and allowed to stand for a short period the front surface of the screen becomes matte. This result is, of course, very desirable but could not have been predicted from the nature of the compositions employed because cellulose nitrate alone does not produce the delustered or matte effect.

The proportions of cellulose nitrate and the lower alkyl ether of cellulose used in the fluorescent composition may vary over a fairly wide range, e. g., from 0.1 to 3.0 parts of said cellulose ether per part by weight of cellulose nitrate.

The ratio of the mixture of binding agents to the fluorescent particles may likewise vary over a fairly wide range, e. g., 1 part by weight of the former to 4 to 50 parts by weight of the latter depending upon the particular fluorescent compound or mixture of compounds used. In general, the smaller the amount of binder the better the fluorescent screen.

The invention will be further illustrated but is not intended to be limited by the following examples wherein the parts stated are parts by weight.

*Example I*

The following ingredients were placed in a ball mill:

| | Parts |
|---|---|
| Calcium wolframate (fluorescent) | 300.0 |
| Methyl ether of ethylene glycol acetate | 54.0 |
| Butyl phthalyl butyl glycollate | 16.5 |
| n-Butyl acetate | 126.0 |
| Cellulose nitrate (150″ viscosity) | 10.0 |
| Ethyl cellulose (45–50% ethoxy content) | 6.5 |

After milling for a period of 4 to 6 hours the resulting suspension is cast through an elongated narrow orifice of about 0.7 mm. onto a thin layer of cellulose acetate which was deposited onto a polished glass plate. The latter layer was cast from a 5 to 10% solution in dioxane to a thickness of about 0.4 mm. After the calcium wolframate coating has set up, a cardboard sheet is applied to the outer surface. A solution of cellulose nitrate in ester or ketone solvents, e. g., methyl acetate, ethyl acetate, acetone, etc., is applied to the outer surface of the cardboard sheet. After drying at room temperature for a period from 10 to 20 hours, the entire assembly is stripped from the glass plate. The surface of the fluorescent screen becomes matte after standing, with free exposure to the atmosphere, for a period of 1 hour.

*Example II*

The following ingredients are placed in a mortar:

| | Parts |
|---|---|
| Barium-lead-sulfate (fluorescent mixed crystals) | 100.0 |
| n-Butyl acetate | 42.5 |
| Methyl ether of ethylene glycol acetate | 18.0 |
| Butyl phthalyl butyl glycollate | 4.0 |
| Cellulose nitrate (150″ viscosity) | 3.3 |
| Ethyl cellulose (ethoxy groups 45–50%) | 2.4 |

After thoroughly mixing the ingredients with a pestle, the suspension is cast through an elongated narrow orifice having a width of about 0.8 mm. onto a thin cellulose acetate film which is coated on a glass plate. The cellulose acetate layer is cast from a 5 to 10% solution in dioxane to a thickness of about 0.4 mm. When the barium lead sulfate coating is set up properly, a cardboard sheet is applied to its outer surface a water-proofing coat is then applied to the outer surface of the cardboard sheet after the manner described in Example I. After drying for a period of 12 to 20 hours at room temperature, the entire assembly is stripped from the glass plate. The surface of the fluorescent screen becomes matte after standing with free exposure to the atmosphere for a period of one hour.

*Example III*

In Example II in place of the cardboard sheet and waterproofing layer the following mixture may be applied to the barium lead sulfate coating to form a layer 1.4 mm. thick:

| | Parts |
|---|---|
| Titania | 2.0 |
| Butyl phthalyl butyl glycollate | 5.0 |
| Methyl ether of ethylene glycol acetate | 17.3 |
| n-Butyl acetate | 87.6 |
| Cellulose nitrate | 11.1 |
| Polyvinyl acetate | 8.9 |

After baking at 65° C. for 10 to 20 hours, the entire assembly is stripped from the glass plate. The surface of the fluorescent screen becomes matte after standing with free exposure to the atmosphere for a period of 1 hour.

Similarly, in place of the particular cellulose ether given in the above examples, one may substitute other cellulose ethers of the water-insoluble varieties including water-insoluble methyl cellulose, water-insoluble benzyl cellulose and mixtures of one or more of these cellulose ethers with each other or with ethyl cellulose.

In place of the particular high boiling solvent given in the foregoing examples, there may be substituted various other high boiling solvents which have a solvent action on cellulose acetate or mixed esters containing a high percentage of acetate groups. Suitable solvents which have a boiling point about 120° C. or higher include methyl lactate, ethyl lactate, diacetone alcohol, acetonyl acetone and mixtures of two or more of such solvents. In addition, various solvents boiling below 120° C., e. g., acetone, butanone, pentanone, ethyl acetate, propyl acetate, amyl acetate, n-propanol, isopropanol and the butanols can be used in admixture with the high-boiling solvents.

In place of the cardboard support described in the foregoing examples, there may be substituted other flexible or stiff supports. Suitable additional supports include plastics, e. g., cellulose derivatives including cellulose acetate, cellulose acetate propionate, cellulose acetate butyrate, ethyl cellulose, cellulose nitrate; superpolymers, e. g., polyvinyl chloride, polyamides, e. g., nylon and polyesters, e. g., polyethylene terephthalate; aluminum and aluminum alloys. These supports should, of course, be permeable to X-rays.

The supports when composed of plastic materials may contain various pigments or dyes in order to make them more or less opaque to light. Suitable materials include $TiO_2$, $ZrO_2$, ZnO, ZnS, Fast Acid Magenta B, Colour Index 30; Azo Cardinal G, Colour Index 42; Alizarine Yellow 4G, Colour Index 52; Naphthol Orange, Colour Index 150; Diamond Yellow R, Colour Index 213; Pontacyl Cloth Red 3G, Colour Index 256; Janus Red B, Colour Index 266; Diamine Yellow N, Colour Index 488; Mililng Scarlet 3B, Colour Index 487.

In place of the particular fluorescent materials described in the foregoing examples, there may be substituted equivalent amounts of various other fluorescent compounds or mixtures of compounds, e. g., zinc cadmium sulfide mixed crystals, magnesium wolframate and zinc silicate. Dispersing agents can be used if desired with the fluorecent materials in making the dispersions.

Clear coatings can be applied as backing coats for the fluorescent screens and serve as an adhesive layer to a card or plastic sheet support. These layers may contain pigments as just described to reduce or increase reflection of fluorescent light. A solution of polyvinyl acetate, for example, provides a suitable adhesive layer. Magnesium oxide-pigmented-cellulose nitrate or -ethyl cellulose solutions form useful pigmented layers.

An advantage of the invention is that it provides a simple and economical process for producing fluorescent screens which have a matte surface. The invention has the advantage that the outer surface is not tacky and therefore at all times during fabrication of the screen only the back side of the layers is exposed to air-borne dust and other particles.

As many widely different embodiments of this invention can be made without departing from the spirit and scope thereof, it is to be understood that the invention is not to be limited except as defined by the claims.

What is claimed is:

1. A fluorescent screen comprising a sheet support having on one surface in order a layer comprising discrete particles of fluorescent material dispersed in a binding agent composed of a mixture of cellulose nitrate and a water-insoluble cellulose ether taken from the group consisting of benzyl cellulose and alkyl cellulose wherein said alkyl group contains from 1 to 7 carbon atoms, said ether being present in a ratio of 0.1 to 3 parts per part by weight of the nitrate said dispersion being in a ratio of 1 part by weight of binding agent to 4 to 50 parts of fluorescent material and an adherent layer having a thickness of 0.002 to 0.05 millimeter composed of a hydrophobic cellulose carboxylic acid ester predominating in acetate groups taken from the group consisting of cellulose acetate, cellulose acetate propionate and cellulose acetate butyrate.

2. A fluorescent screen comprising a sheet support having on one surface in order a layer comprising discrete particles of fluorescent material dispersed in a binding agent composed of a mixture of cellulose nitrate and a water-insoluble cellulose 1 to 7 carbon atom alkyl ether, said ether being present in a ratio of 0.1 to 3 parts per part by weight of the nitrate, said dispersion being in a ratio of 1 part by weight of binding agent to 4 to 50 parts of fluorescent material and an adherent layer having a thickness of 0.002 to 0.05 millimeter composed of a hydrophobic cellulose carboxylic acid ester predominating in acetate groups taken from the group consisting of cellulose acetate, cellulose acetate propionate and cellulose acetate butyrate.

3. A fluorescent screen comprising a sheet support having on one surface in order a layer comprising discrete particles of fluorescent material dispersed in a binding agent composed of a mixture of cellulose nitrate and water-insoluble ethyl cellulose, said ether being present in a ratio of 0.1 to 3 parts per part by weight of the nitrate, said dispersion being in a ratio of 1 part by weight of binding agent to 4 to 50 parts of fluorescent material and a layer having a thickness of 0.002 to 0.05 millimeter composed of a hydrophobic cellulose carboxylic acid ester predominating in acetate groups, taken from the group consisting of cellulose acetate, cellulose acetate propionate and cellulose acetate butyrate.

4. A fluorescent screen comprising a sheet support bearing a layer comprising discrete particles of fluorescent barium-lead sulfate mixed crystals dispersed in a binding agent composed of a mixture of cellulose nitrate and water-insoluble ethyl cellulose and a layer having a thickness of 0.002 to 0.05 millimeter composed of a hydrophobic cellulose carboxylic acid ester predominating in acetate groups.

5. A fluorescent screen comprising a flexible cardboard sheet bearing in order on one surface a layer composed of discrete particles of fluorescent material dispersed in a binding agent composed of a mixture of cellulose nitrate and water-insoluble ethyl cellulose, said ether being present in a ratio of 0.1 to 3 parts per part by weight of the nitrate, said dispersion being in a ratio of 1 part by weight of binding agent to 4 to 50 parts of fluorescent material, and an adherent layer having a thickness of 0.002 to 0.05 millimeter composed of hydrophobic cellulose acetate.

6. A fluorescent screen comprising a flexible cardboard sheet bearing in order on one surface a layer composed of discrete particles of fluorescent calcium wolframate dispersed in a binding agent composed of a mixture of cellulose nitrate and water-insoluble ethyl cellulose, said ether being present in a ratio of 0.1 to 3 parts per part by weight of the nitrate, said dispersion being in a ratio of 1 part by weight of binding agent to 4 to 50 parts of fluorescent material, and an adherent layer having a thickness of 0.002 to 0.05 millimeter composed of hydrophobic cellulose acetate.

7. A fluorescent screen comprising a flexible cardboard sheet bearing in order on one surface a layer composed of discrete particles of fluorescent barium-lead-sulfate mixed crystals dispersed in a binding agent composed of a mixture of cellulose nitrate and water-inslouble ethyl cellulose, said ether being present in a ratio of 0.1 to 3 parts per part by weight of the nitrate, said dispersion being in a ratio of 1 part by weight of binding agent to 4 to 50 parts of fluorescent material, and an adherent layer having a thickness of 0.002 to 0.05 millimeter composed of hydrophobic cellulose acetate.

8. The process which comprises coating a thin layer of a hydrophobic cellulose carboxylic acid ester predominating in acetate groups taken from the group consisting of cellulose acetate, cellulose acetate propionate and cellulose acetate butyrate onto a casting surface, coating a dispersion comprising discrete particles of a fluorescent material in a mixture comprising (a) cellulose nitrate and a water-insoluble cellulose ether, said ether being present in a ratio of 0.1 to 3 parts per part by weight of the nitrate, said dispersion being in a ratio of 1 part by weight of the binding agent to 4 to 50 parts of fluorescent material and (b) a high-boiling cellulose acetate solvent onto the cellulose ester layer, applying a backing sheet to the layer of fluorescent particles and stripping the screen assembly from the casting surface.

9. A fluorescent screen comprising a sheet support having in order on one surface, an adhesive layer containing a pigment and a layer comprising discrete particles of fluorescent material dispersed in a binding agent composed of a mixture of cellulose nitrate and a water-insoluble cellulose ether taken from the group consisting of benzyl cellulose and alkyl cellulose wherein said alkyl group contains 1 to 7 carbon atoms, said ether being present in a ratio of 0.1 to 3 parts per part by weight of the nitrate, said dispersion being in a ratio of 1 part by weight of binding agent to 4 to 50 parts of fluorescent material and an adherent layer having a thickness of 0.002 to 0.05 millimeter composed of a hydrophobic cellulose carboxylic acid ester predominating in acetate groups taken from the group consisting of cellulose acetate, cellulose acetate propionate and cellulose acetate butyrate.

10. A fluorescent screen comprising a sheet support having in order on one surface, an adhesive layer containing a pigment and a layer comprising discrete particles of fluorescent material dispersed in a binding agent composed of a mixture of cellulose nitrate and a water-insoluble cellulose 1 to 7 carbon atom alkyl ether, said ether being present in a ratio of 0.1 to 3 parts per part by weight of the nitrate, said dispersion being in a ratio of 1 part by weight of binding agent to 4 to 50 parts of fluorescent material and a layer having a thickness of 0.002 to 0.05 millimeter composed of an adherent hydrophobic cellulose carboxylic acid ester predominating in acetate groups taken from the group consisting of cellulose acetate, cellulose acetate propionate and cellulose acetate butyrate.

11. A process as set forth in claim 8 wherein said cellulose ester is cellulose acetate, said material is calcium wolframate and said solvent is the methyl ether of ethylene glycol acetate.

References Cited in the file of this patent

UNITED STATES PATENTS

| | | |
|---|---|---|
| 1,824,690 | Schneider | Sept. 22, 1931 |
| 2,076,984 | Eggert et al. | Apr. 13, 1937 |
| 2,089,413 | Paine et al. | Aug. 10, 1937 |
| 2,119,702 | Carroll | June 7, 1938 |
| 2,298,968 | Roberts et al. | Oct. 13, 1942 |
| 2,310,740 | Leavy | Feb. 9, 1943 |
| 2,375,177 | Reese | May 1, 1945 |
| 2,417,383 | Switzer | Mar. 11, 1947 |
| 2,520,113 | Brown et al. | Aug. 29, 1950 |
| 2,554,150 | Moore | May 22, 1951 |

FOREIGN PATENTS

| | | |
|---|---|---|
| 597,425 | Great Britain | Jan. 26, 1948 |